United States Patent
Langenfeld (10) Patent No.: US 9,410,631 B1
(45) Date of Patent: Aug. 9, 2016

(54) VALVE

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 244 days.

(21) Appl. No.: 14/197,892

(22) Filed: Mar. 5, 2014

Related U.S. Application Data (60) Continuation of application No. 13/417,379, filed on Mar. 12, 2012, now abandoned, which is a division of application No. 12/166,911, filed on Jul. 2, 2008, now Pat. No. 8,132,588.

(51) Int. Cl.
*F16K 11/065* (2006.01)
*G05D 11/02* (2006.01)
*F16H 61/4104* (2010.01)
*F16K 17/18* (2006.01)

(52) U.S. Cl.
CPC .............. *F16K 11/065* (2013.01); *F16K 17/18* (2013.01); *F16H 61/4104* (2013.01); *G05D 11/02* (2013.01); *Y10T 137/2521* (2015.04); *Y10T 137/2564* (2015.04); *Y10T 137/2567* (2015.04)

(58) Field of Classification Search
USPC ..................... 137/100, 111, 112, 114; 60/464
See application file for complete search history.

(56) References Cited

U.S. PATENT DOCUMENTS

| | | | |
|---|---|---|---|
| 776,061 A | 11/1904 | Hewett | |
| 1,736,749 A | 11/1929 | Penn | |
| 2,069,366 A * | 2/1937 | Heerdt | F16H 61/40 137/109 |
| 2,122,045 A * | 6/1938 | Rose | F16H 61/40 137/494 |
| 2,657,533 A | 11/1953 | Schanzlin et al. | |
| 2,675,016 A | 4/1954 | Siver | |
| 2,781,639 A * | 2/1957 | Badalini | F16H 61/40 137/112 |
| 2,961,829 A | 11/1960 | Weisenbach | |
| 3,078,674 A | 2/1963 | Anderson | |
| 3,182,454 A | 5/1965 | Jonkers et al. | |
| 3,576,192 A | 4/1971 | Wood et al. | |
| 3,636,708 A * | 1/1972 | Karman | F15B 7/006 60/462 |
| 3,863,449 A | 2/1975 | White, Jr. | |
| 3,866,421 A * | 2/1975 | Kersten | F16H 61/4104 60/456 |
| 3,901,261 A | 8/1975 | Riis | |
| 4,128,113 A | 12/1978 | Hart | |
| 4,253,382 A | 3/1981 | Yip | |
| 4,332,134 A | 6/1982 | Cochran et al. | |
| 4,343,601 A | 8/1982 | Thorson | |
| 4,616,982 A | 10/1986 | Quarve | |

(Continued)

*Primary Examiner* — Kevin Murphy
*Assistant Examiner* — Jonathan Waddy
(74) *Attorney, Agent, or Firm* — Neal, Gerber & Eisenberg LLP (57) ABSTRACT

A valve for use between a first fluid side and a second fluid side is disclosed herein. The valve comprises a pair of subassemblies, each one slidable between a closed position and an open position. Each subassembly comprises a first component comprising a first component main body, a first component first end and a first component second end opposite the first component first end. A first component first extension is formed on each first component first end, the first component first extension comprising a diameter that is less than the diameter of the first component main body. Hydraulic pressure causes one subassembly to slide to its closed position, and causes it to engage the second subassembly, sliding the second subassembly to its open position.

20 Claims, 8 Drawing Sheets

(56) References Cited

U.S. PATENT DOCUMENTS

| | | | |
|---|---|---|---|
| 4,645,438 A | 2/1987 | Dahlquist | |
| 4,691,730 A | 9/1987 | Portolese et al. | |
| 4,779,417 A | 10/1988 | Kita | |
| 4,850,192 A | 7/1989 | Mitsumasa et al. | |
| 5,038,827 A | 8/1991 | Heffner et al. | |
| 5,152,312 A | 10/1992 | Kogel | |
| 5,190,356 A * | 3/1993 | Knowles | F16K 11/048 137/111 |
| 5,314,387 A | 5/1994 | Hauser et al. | |
| 5,328,343 A | 7/1994 | Bernstrom et al. | |
| 5,546,751 A | 8/1996 | Last | |
| 5,746,509 A * | 5/1998 | Gebhard | B28C 5/421 366/61 |
| 6,430,923 B1 | 8/2002 | Meier | |
| 6,581,378 B1 | 6/2003 | Lebrun | |
| 6,811,510 B1 | 11/2004 | Langenfeld et al. | |
| 6,826,909 B2 | 12/2004 | Walls | |
| 6,986,406 B1 | 1/2006 | Hauser et al. | |
| 7,155,910 B2 | 1/2007 | Last | |
| 7,234,487 B2 | 6/2007 | Jacobson et al. | |
| 7,243,671 B2 | 7/2007 | Thrash, Jr. et al. | |
| 7,273,107 B2 | 9/2007 | Hiron et al. | |
| 2004/0187491 A1 | 9/2004 | Whitaker et al. | |

\* cited by examiner

VALVE

RELATED APPLICATIONS

This application is a continuation of U.S. patent application Ser. No. 13/417,379, filed Mar. 12, 2012, now abandoned, which is a divisional of U.S. patent application Ser. No. 12/166,911, filed on Jul. 2, 2008, now U.S. Pat. No. 8,132,588. The contents of these applications are incorporated by reference herein in their entirety.

BACKGROUND OF THE INVENTION

This invention relates generally to the design of valves and, more particularly, to the design of a shuttle valve for use in a hydraulic component such as a hydraulic motor or a hydrostatic transmission or transaxle having an integral hydraulic circuit comprising a pump and motor in fluid communication.

Shuttle valves are known in the art. Generally, a shuttle valve is utilized to alternately divert hydraulic fluid from the first or second fluid side of a hydraulic circuit for cooling purposes, lubrication purposes or to power auxiliary hydraulic devices. Shuttle valves have tended to comprise a ball or piston biased to one or another seat by, or even dampened by, one or more springs that can be subject to fatigue. Shuttle valves have generally required tight tolerances, making them subject to contamination from the fine metal debris ejected by the rotating kits of hydraulic pumps, motors, or associated gear trains.

SUMMARY OF THE INVENTION

A shuttle valve is provided for use in diverting hydraulic fluid from the low, or vacuum, pressure side of a hydraulic circuit. The bi-directional, spring-free valve comprises a pair of identical, opposing poppets or pistons, sealingly engaging one or another end of a passage linking the first and second fluid sides of a hydraulic circuit. The poppet proximate to the high pressure side of the hydraulic circuit, by virtue of the relatively greater fluid forces present, sealingly engages a first end of the passage while displacing the opposing poppet from the low pressure end of the passage. The passage is adapted to communicate with a bleed orifice permitting hydraulic fluid from the low pressure side to be diverted for cooling, lubrication, or auxiliary purposes.

A better understanding of the objects, advantages, features, properties and relationships of the invention will be obtained from the following detailed description and accompanying drawings which set forth illustrative embodiments and are indicative of the various ways in which the principles of the invention may be employed.

DETAILED DESCRIPTION

Figure 1:
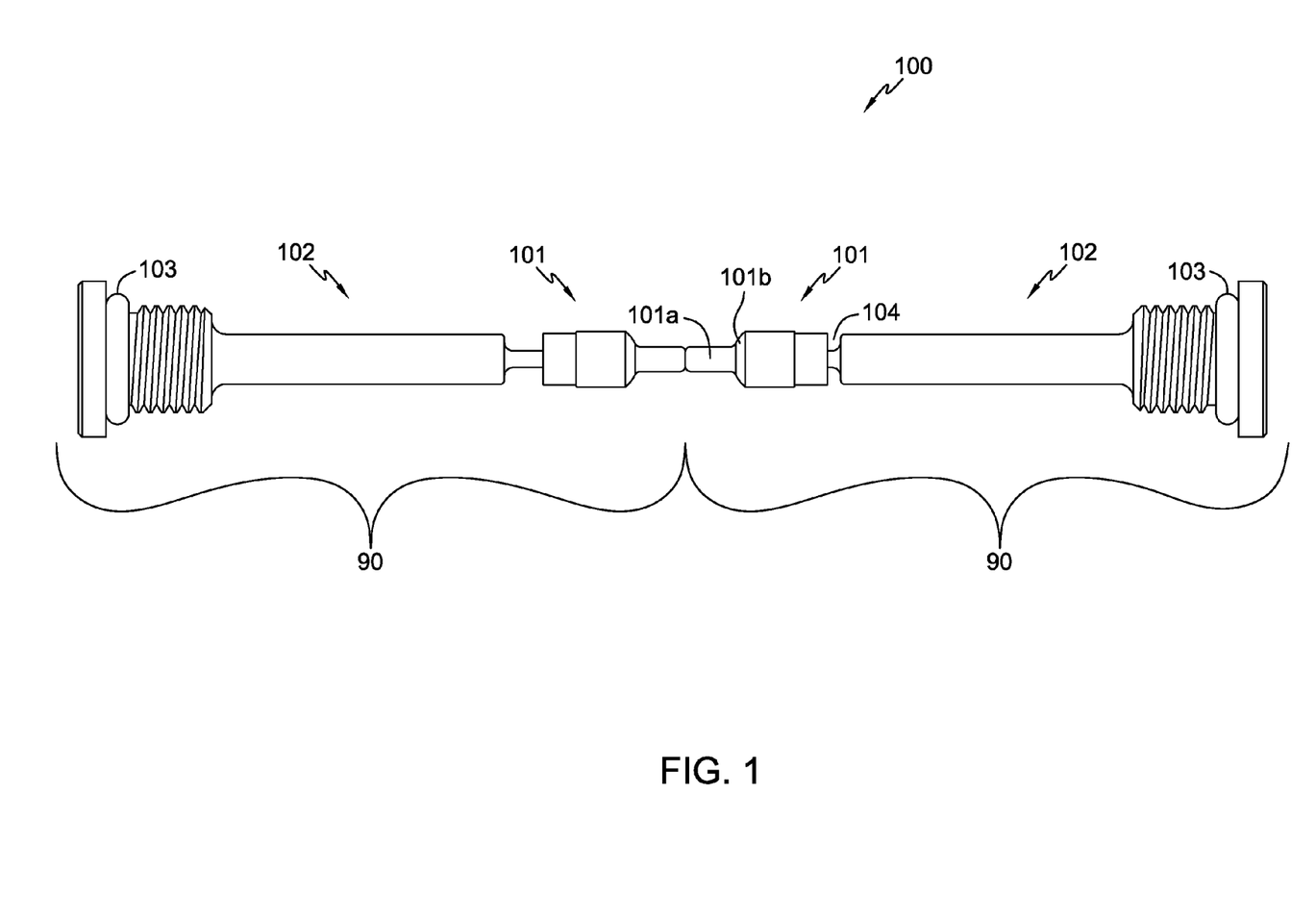
FIG. 1 is a side elevational view of a valve in accordance with the present invention.
Figure 2:
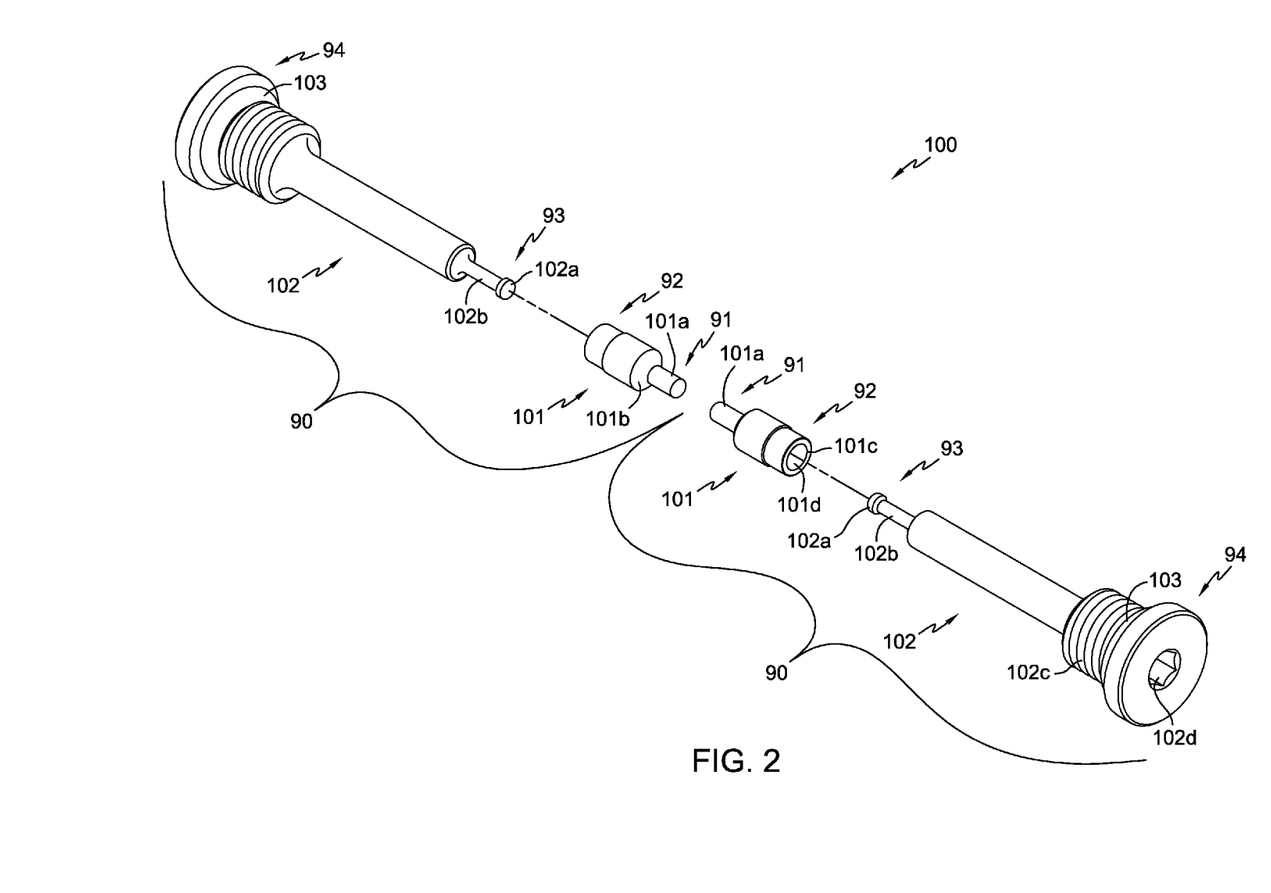
FIG. 2 is a partially exploded, perspective view of the valve shown in FIG. 1.

FIGS. 1 and 2 illustrate a first embodiment of a valve 100 in accordance with the present invention comprising two subassemblies 90 that function as a single shuttle valve. In the depicted embodiment, subassemblies 90 are identical, but it will be obvious to those in the art that the scope of the present invention includes subassemblies 90 that are not identical.

As depicted, each subassembly 90 comprises poppet 101, valve plug 102, and O-ring 103. Each poppet 101 comprises poppet first end 91 and poppet second end 92. Extended tip 101a and annular shoulder 101b are formed at first end 91, while opening 101c to interior volume 101d is formed at second end 92. As seen, the diameter of extended tip 101a is less than that of the remainder of poppet 101.

As seen, for example, in FIG. 2, each valve plug 102 comprises valve plug first end 93 and valve plug second end 94. Retainer 102a, at the end of reduced diameter extension 102b, is formed at valve plug first end 93. Retainer 102a has a diameter less than the diameter of opening 101c, permitting retainer 102a and extension 102b to slide within interior volume 101d without interference. Valve plug 102 may comprise standardized threads 102c and hex fitting 102d formed on valve plug second end 94, such as those found on a standardized SAE port plug. It will be appreciated by those in the art, however, that the scope of the present invention includes those embodiments in which valve plug 102 comprises any known means to affix valve plug 102 to a hydraulic component. In the depicted embodiment, to provide sealing engagement with the valve ports of any hydraulic component adapted for use with valve 100, each subassembly is fitted with an O-ring 103.

Figure 5:
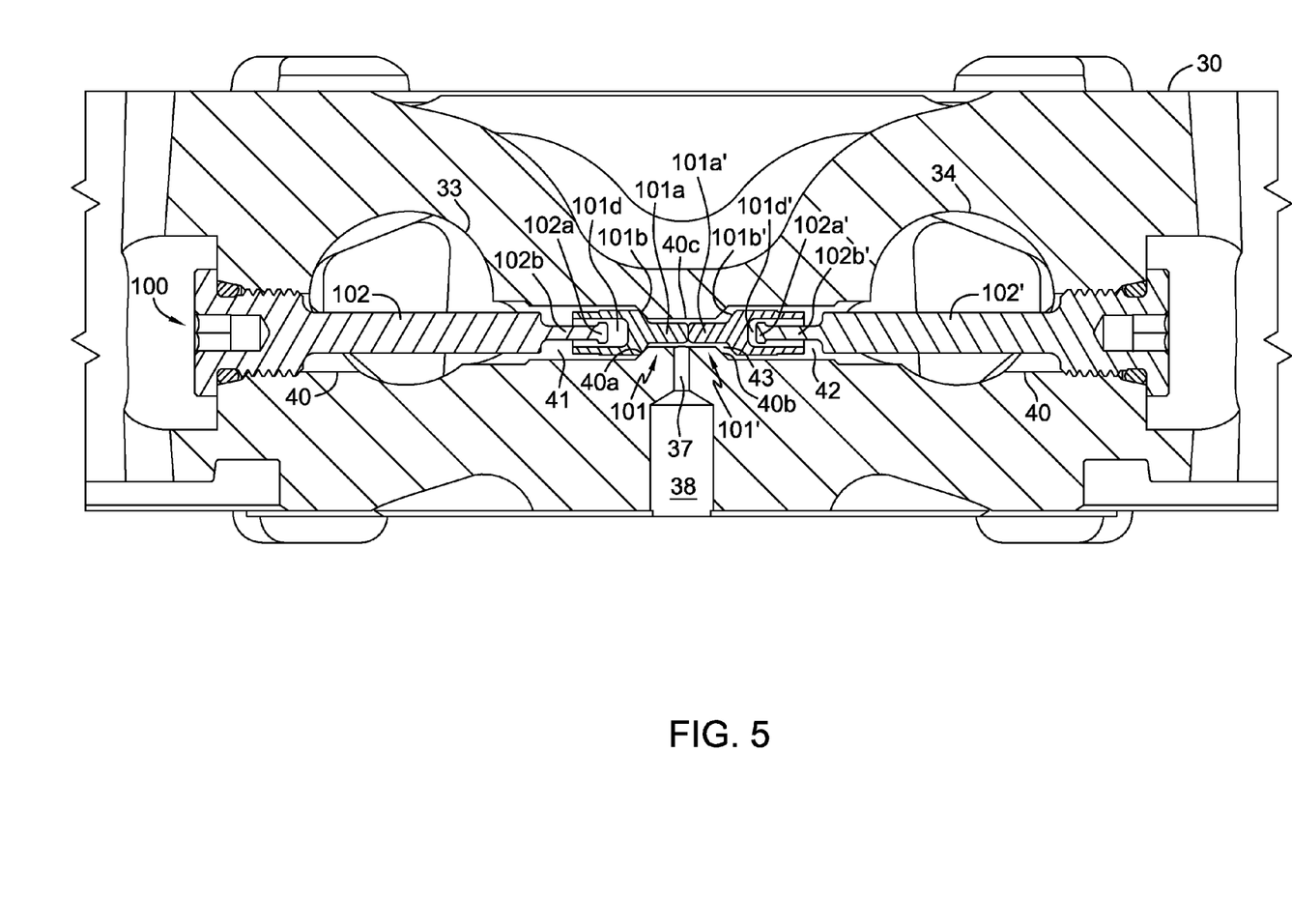
FIG. 5 is a cross-sectional view of the motor port block of FIG. 4 along the lines 5-5 showing the valve within an adapted valve bore.

As seen, for example, in FIG. 5, each valve plug 102 is dimensioned such that the extended tips 101a may contact and act on each other when installed in an adapted hydraulic component. During high flow operation, neither poppet 101 is compressed against its respective retainer 102a because of the fluid forces acting on both subassemblies 90. Each poppet 101 is free to travel along the length of its respective extension 102b. Furthermore, the combined length of retainer 102a and extension 102b is greater than the axial length of interior volume 101d. This permits gap 104, seen in FIG. 1, to be maintained between poppet second end 92 and valve plug 102, should retainer 102a abut the end of interior volume 101d during low flow operation. Gap 104 permits hydraulic fluid forces to continually act on the surfaces of interior volume 101d, increasing valve responsiveness, though it will be understood by one of skill in the art that in the absence of such a gap, hydraulic fluid forces acting on the exterior of poppet 101 will enable valve function.

Figure 3:
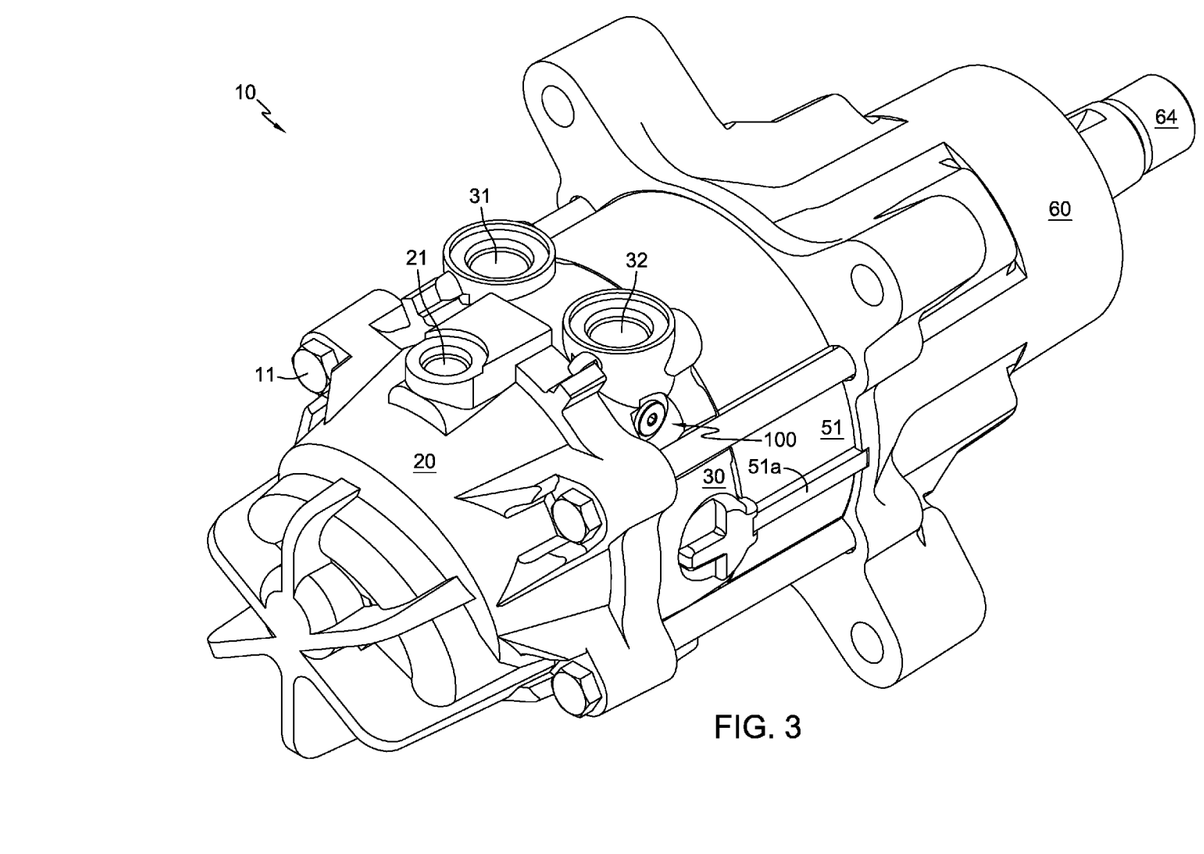
FIG. 3 is a perspective view of a hydraulic motor and reduction gear assembly utilizing a valve in accordance with the present invention.
Figure 4:
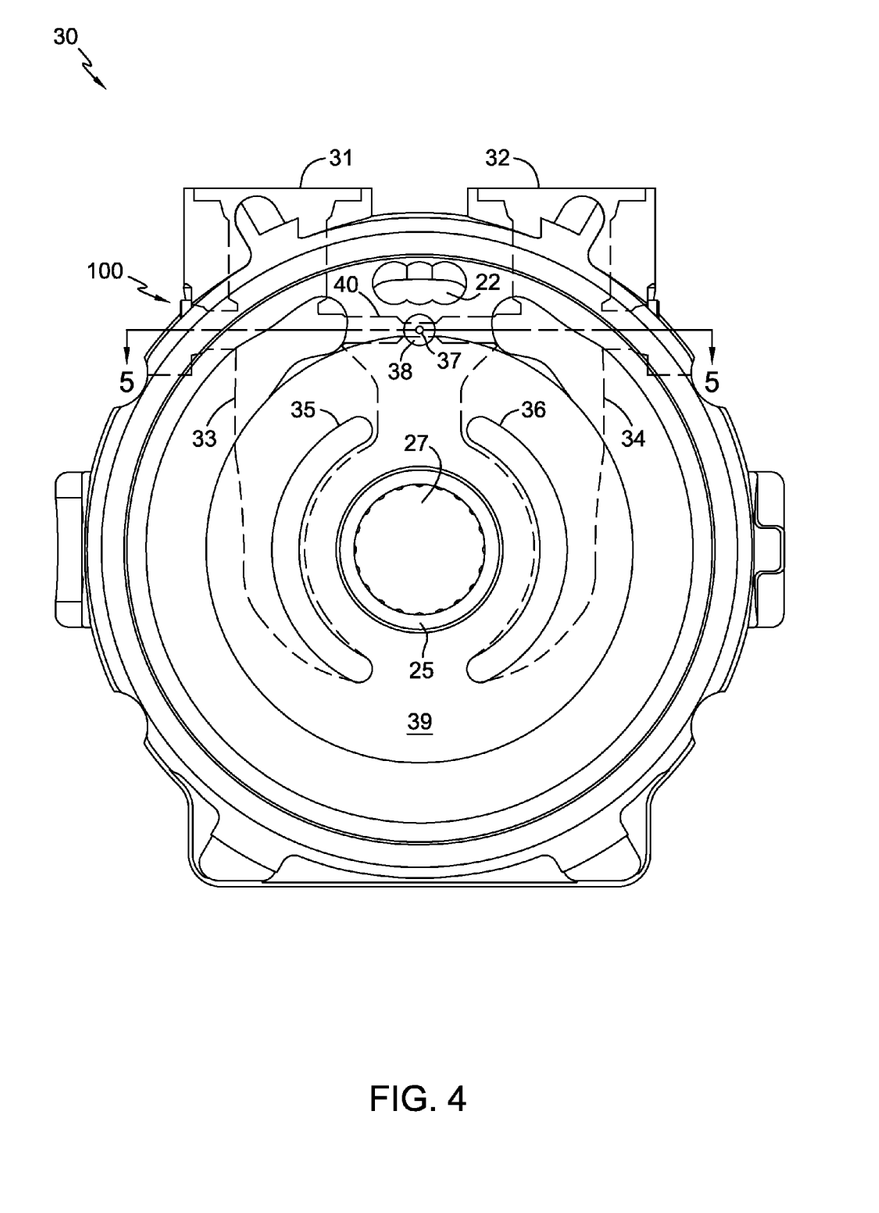
FIG. 4 is an end elevational view of the motor port block of the hydraulic assembly of FIG. 3.

As is evident in FIGS. 3-5, the division of the valve 100 into subassemblies simplifies its installation into hydraulic components, such as that represented by hydraulic motor assembly 10, allowing insertion of the subassemblies 90 from opposite ends of a common valve bore 40 that intersects the first and second fluid sides of the hydraulic motor assembly 10.

This feature provides hydraulic component designers with the flexibility to apply the valve 100 in a variety of locations without limiting its application to the split lines between the elements or housings of a given hydraulic component.

Figure 7:
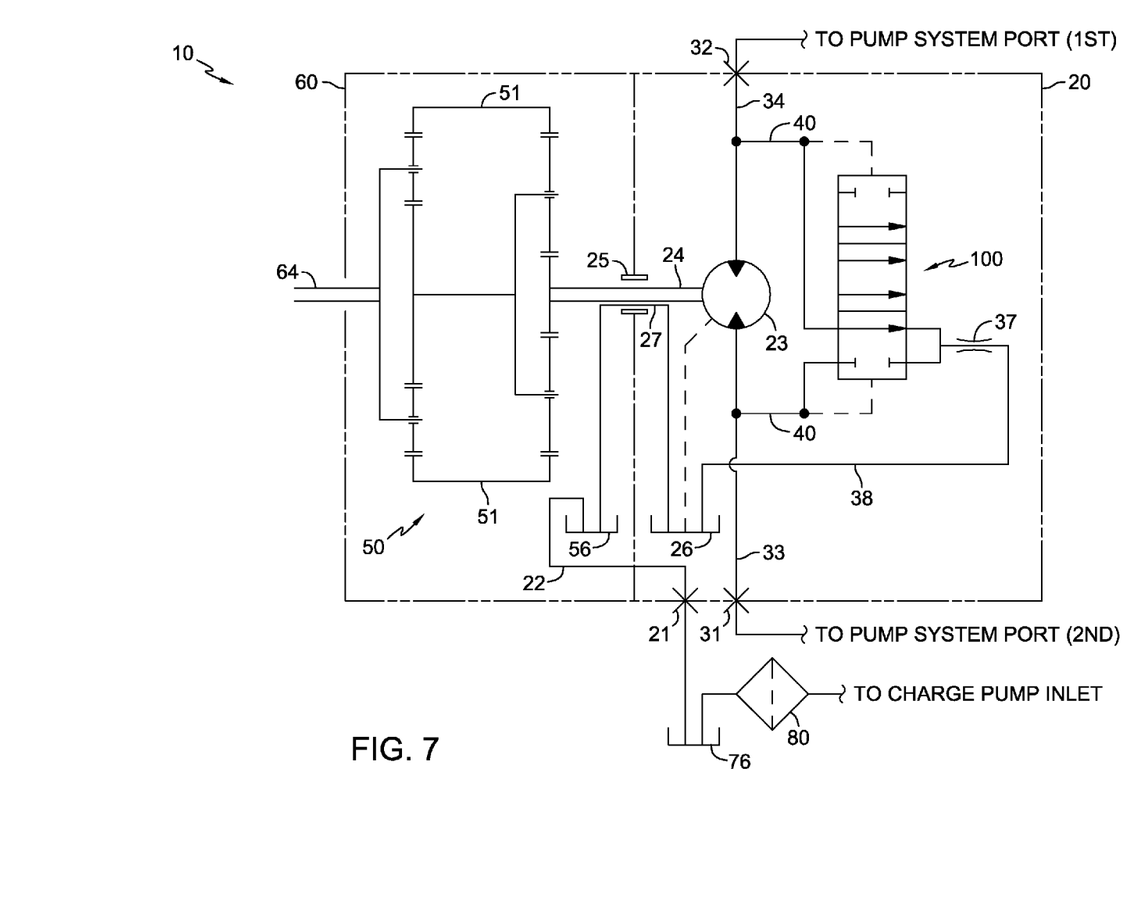
FIG. 7 is a schematic of the hydraulic assembly of FIG. 3 utilizing a valve in accordance with the present invention.

FIGS. 3, 4 and 7 illustrate application of the present invention to a hydraulic motor assembly 10 having an axial piston motor 23 and a dual planetary reduction mechanism 50 similar to that detailed in commonly owned U.S. Pat. No. 6,811,510, the terms of which are incorporated herein by reference and will not be detailed herein except to the extent necessary for understanding of the present invention. For simplicity, many of the details of motor assembly 10 are shown schematically in FIG. 7, and the features are depicted in FIGS. 3 and 4. It should further be understood that application of valve 100 to hydraulic motor assembly 10 is for illustration purposes only and not meant to limit application of the present invention, which may be applied to other hydraulic components such as an integrated hydrostatic transmission. The teachings of U.S. Pat. Nos. 5,314,387 and 6,986,406 relating to such an integrated hydrostatic transmission are also incorporated herein by reference.

Hydraulic motor assembly 10 comprises a motor housing 20 forming a first volume or motor sump 26 about an axial piston motor 23 rotatably disposed on running surface 39 of motor port block 30. Motor housing 20 is sealing engaged to the periphery of a first face of motor port block 30, which in turn, is sealingly engaged to a first edge of ring gear 51 at the periphery of a second, opposite face. The second, opposite edge of ring gear 51 is sealing engaged to axle housing 60, the ring gear 51 being rotationally restrained by a pair of ribs 51a on opposite sides of ring gear 51 that are captured by the motor port block 30 and axle housing 60. The assemblage as described is held together by a plurality of fasteners 11 spanning the motor port block 30 and ring gear 51, which are thus captured between the fastened motor housing 20 and axle housing 60. Ring gear 51 and axle housing 60 form a second volume or gear sump 56 containing the dual planetary reduction mechanism 50 and an axle shaft 64 having a first end which extends from axle housing 60 for operative engagement.

This bi-directional hydraulic motor assembly 10 is driven by pressurized hydraulic fluid from a hydraulic pump (not shown) in closed-loop, fluid communication with the system ports 31 and 32 of pump motor block 30. In describing a first rotational direction of operation, the pressurized hydraulic fluid enters hydraulic motor assembly 10 through system port 31. The fluid then proceeds through corresponding porting 33 and kidney port 35 to sequentially displace the pistons (not shown) of axial piston motor 23 against a fixed angle thrust bearing (not shown), thereby providing rotation to a motor shaft 24 fixedly mounted to the motor block (not shown) of axial piston motor 23. Hydraulic fluid at low or vacuum pressure is then exhausted through kidney port 36, corresponding porting 34 and system port 32 to return to the hydraulic pump of the closed loop. Motor shaft 24 rotatably engages the dual planetary reduction mechanism 50, thereby driving axle shaft 64, whose second end is rotatably engaged to mechanism 50, at a reduced rotational speed. The specific workings of dual planetary reduction mechanism 50 are detailed in previously cited U.S. Pat. No. 6,811,510 and will not be further discussed herein. Such features are not critical to this invention and are discussed herein merely for the sake of completeness.

Valve 100 is applied to a hydraulic component through adapted valve bore 40, which is in fluid communication with the first and second fluid sides of the closed hydraulic circuit. Once positioned, one valve subassembly 90 is located proximate to the first fluid side, and the other subassembly 90 is located proximate to the second fluid side. As applied to hydraulic motor assembly 10, and as best shown in FIG. 4, valve bore 40 intersects porting 33 and porting 34, placing valve 100 in fluid communication with both the first and second fluid sides of the closed hydraulic circuit. Valve bore 40 further opens to the exterior of motor port block 30 at each end, permitting valve 100 to be inserted as previously described. The portion of valve bore 40 lying between porting 33 and porting 34 intersects a bleed orifice 37, allowing diverted hydraulic fluid to be channeled through bleed orifice 37 to a gallery 38, and then on to motor sump 26. FIGS. 4 and 7 also depict drain passage 22 which permits hydraulic fluid from gear sump 56, potentially containing fine metal gear debris from dual planetary reduction mechanism 50, to be routed through case drain port 21 (without contaminating motor sump 26) to an external reservoir 76 for cooling and later filtering via filter 80. FIG. 4 further depicts needle bearing 25 in through-passage 27, which provides rotational support to motor shaft 24.

FIG. 5 more clearly illustrates the function of valve 100 in valve bore 40. For purposes of operational explanation, in FIG. 5, the elements of the left-hand valve subassembly are labeled as in FIGS. 1 and 2, while the identical elements in the right-hand valve subassembly are now labeled with a "prime" designation. Valve bore 40 comprises a plurality of segments having decreasing diameters as a central segment 40c is approached from either end of the bore 40. An annulus of a diameter greater than that of central segment 40c lies at each end of segment 40c, the annuli serving as seating surfaces 40a and 40b for poppets 101 and 101', respectively. The system pressures present in porting 33 and porting 34 are also present in valve bore volumes 41 and 42, respectively. Correspondingly, those same relative pressures are present in the interior volumes 101d and 101d' of poppets 101 and 101', respectively. As depicted in FIG. 5, the greater relative pressure in porting 33, as compared to porting 34, creates a greater fluid force acting on poppet 101 than its equally dimensioned counterpart, poppet 101'. Consequently, the extended tip 101a of poppet 101 acts directly on the extended tip 101a' of poppet 101', displacing poppet 101' to the right. As a result, annular shoulder 101b sealingly engages valve seat 40a to prevent diversion of high pressure fluid from the closed loop. This valve characteristic, as applied to hydraulic motor assembly 10 in a closed hydraulic circuit, reduces power loss associated with bleeding hydraulic fluid from the high pressure side. It should be noted that the extended tips 101a and 101a' of each poppet are dimensioned such that one or the other poppet may be seated at any given time, but not both. It should also be recognized that in combination, retainer 102a and extension 102b serve to help locate poppet 101 on valve seat 40a, reducing radial movement of the poppet 101 while permitting axial movement thereof.

Displacement of poppet 101' from valve seat 40b opens a pathway 43 for low pressure hydraulic fluid to be diverted from porting 34 through central segment 40c and bleed orifice 37 to the associated gallery 38 leading to motor sump 26. The manner in which annular shoulders 101b and 101b' engage valve seats 40a and 40b respectively, and the manner in which the corresponding retainers 102a or 102a' and extensions 102b or 102b' act to guide poppets 101 and 101', allows the tolerances between various components of valve 100 and valve bore 40, as well as the outside diameters of central segment 40c and bleed orifice 37, to be dimensioned to effect a desired flow rate. The ability to enlarge various dimensions of the valve bore 40 and subsequent passages provides the advantage of reducing the sensitivity of valve 100 to contamination.

Returning to FIG. 7 and the specific application of valve 100 to hydraulic motor assembly 10, the increased volume of fluid from porting 34 that enters valve bore 40, together with nominal fluid losses from axial piston motor 23, translates to increased fluid flow into motor sump 26. The resultant increase in fluid volume is relieved through bearing 25 and through-passage 27, effectively creating a beneficial forced lubrication arrangement. In the depicted embodiment, bearing 25 is a needle bearing, but it will be obvious to those in the art that the scope of the present invention includes those embodiments using various types of bearings.

Hydraulic fluid passed through bearing 25 into gear sump 56 exits hydraulic motor assembly 10 via drain passage 22 and case drain 21. Such fluid is collected in an external reservoir 76, allowing the fluid to be cooled and subsequently drawn through filter 80 by a charge pump (not shown) that replaces fluid losses. This process provides critical components in the closed loop, such as the thrust bearing (not shown) of hydraulic motor assembly 10, with a contaminant-free source of cooled hydraulic fluid—extending the life of such critical components. Should heat loads in the closed loop be such that additional cooling is needed, a dedicated oil cooler can be placed in the make-up circuit.

It should be noted that, in applications other than hydraulic motor assembly 10, hydraulic fluid diverted by valve 100 through bleed orifice 37 can be directed through alternate pathways for auxiliary purposes such as engaging clutches, disengaging brake mechanisms, or operating a lift mechanism. In reference to FIG. 7, it should also be noted that application of valve 100 to a closed-loop system requires the presence of a charge pump to maintain the low pressure fluid side at a pressure above that of case pressure in the motor housing 20. Otherwise, the flow of fluid through valve 100 will be reversed, drawing fluid from motor sump 26 into the closed loop. The same principle applies to any closed-loop application, wherein a charge pump must maintain sufficient pressure on the low pressure fluid side of the hydraulic circuit to prevent reverse flow through the valve 100.

Figure 6:
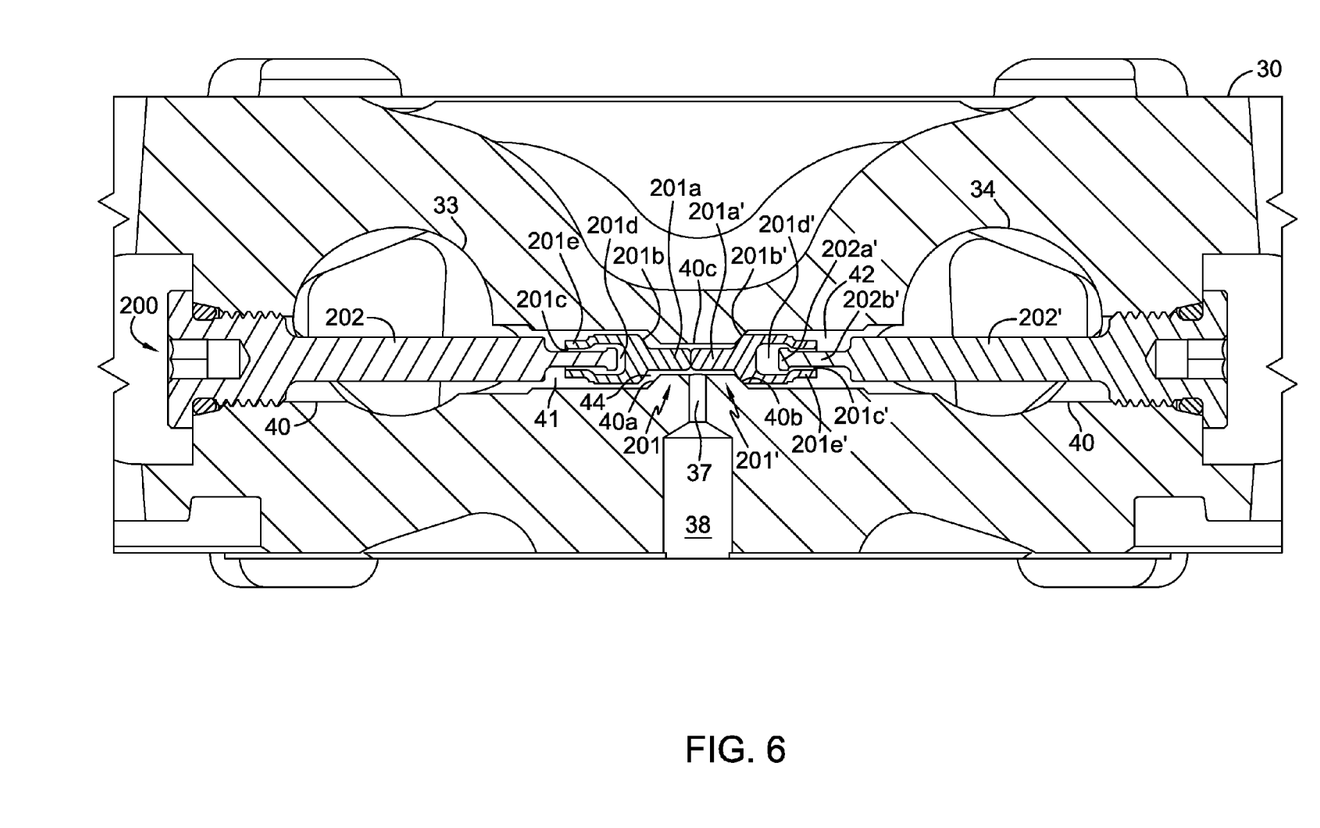
FIG. 6 is an enlargement of the same cross-sectional view of FIG. 5 showing another embodiment of the valve utilizing a crimp to retain the poppets on the valve plugs.

FIG. 6 depicts a second embodiment of the present invention, valve 200. For comparative purposes, valve 200 is again applied via valve bore 40 in motor port block 30. The chief distinction from the prior disclosed embodiment is that the poppets 201 and 201' are both crimped along a trailing section 201e and 201e', reducing the diameter of their respective openings 201c and 201c'. Referring to the right-hand subassembly of valve 200, opening 201c' has a diameter less than that of retainer 202a' and greater than that of extension 202b'. Consequently, poppet 201' is slidably retained on valve plug 202', simplifying insertion of valve 200 into motor port block 30 during assembly.

FIG. 6 further illustrates the bi-directional nature of the present invention, showing the operation of the valve 200 when the direction of hydraulic fluid flow in the closed loop has been reversed from that shown in FIG. 5. As depicted, the relative fluid pressure in porting 34 is greater than that of porting 33, shifting poppets 201 and 201' to the left. More specifically, the fluid pressures in porting 34, valve bore volume 42, and poppet internal volume 201d' are identical. The crimped diameter of opening 201c' is such that fluid readily passes between the internal surface of trailing section 201e' and extension 202b', allowing such pressure equalization. Similarly, the fluid pressures in porting 33, valve bore volume 41, and poppet internal volume 201d are identical. The greater relative pressure in porting 34, as compared to porting 33, creates a greater fluid force acting on poppet 201' than its equally dimensioned counterpart, poppet 201. Consequently, extended tip 201a' acts directly on extended tip 201a, displacing poppet 201 to the left. As a result, valve seat 201b' sealingly engages seating surface 40b to prevent diversion of high pressure fluid from the closed loop. It should also be recognized that the crimping of poppets 201 and 201' further reduces radial movement of the poppets, providing additional help in seating annual shoulders 201b and 201b'. Displacement of poppet 201 from valve seat 40a opens a pathway 44 for low pressure hydraulic fluid to be diverted from porting 33 through central segment 40c and bleed orifice 37 to the associated gallery 38 leading to motor sump 26.

It should be noted that, because of the absence of springs and the relatively small mass of the poppets, the present invention is highly responsive to the pressure differential between the first and second fluid sides of the hydraulic circuit. A transitional state in which both poppets are unseated can exist under circumstances in which both fluid sides are at or near charge pressure, though under most operational conditions, one or the other poppet remains seated, continually providing the benefit of improved cooling, lubrication or auxiliary power as the case may be. The schematic representation of valve 100 in FIG. 7 includes this transitional state.

Figure 8:
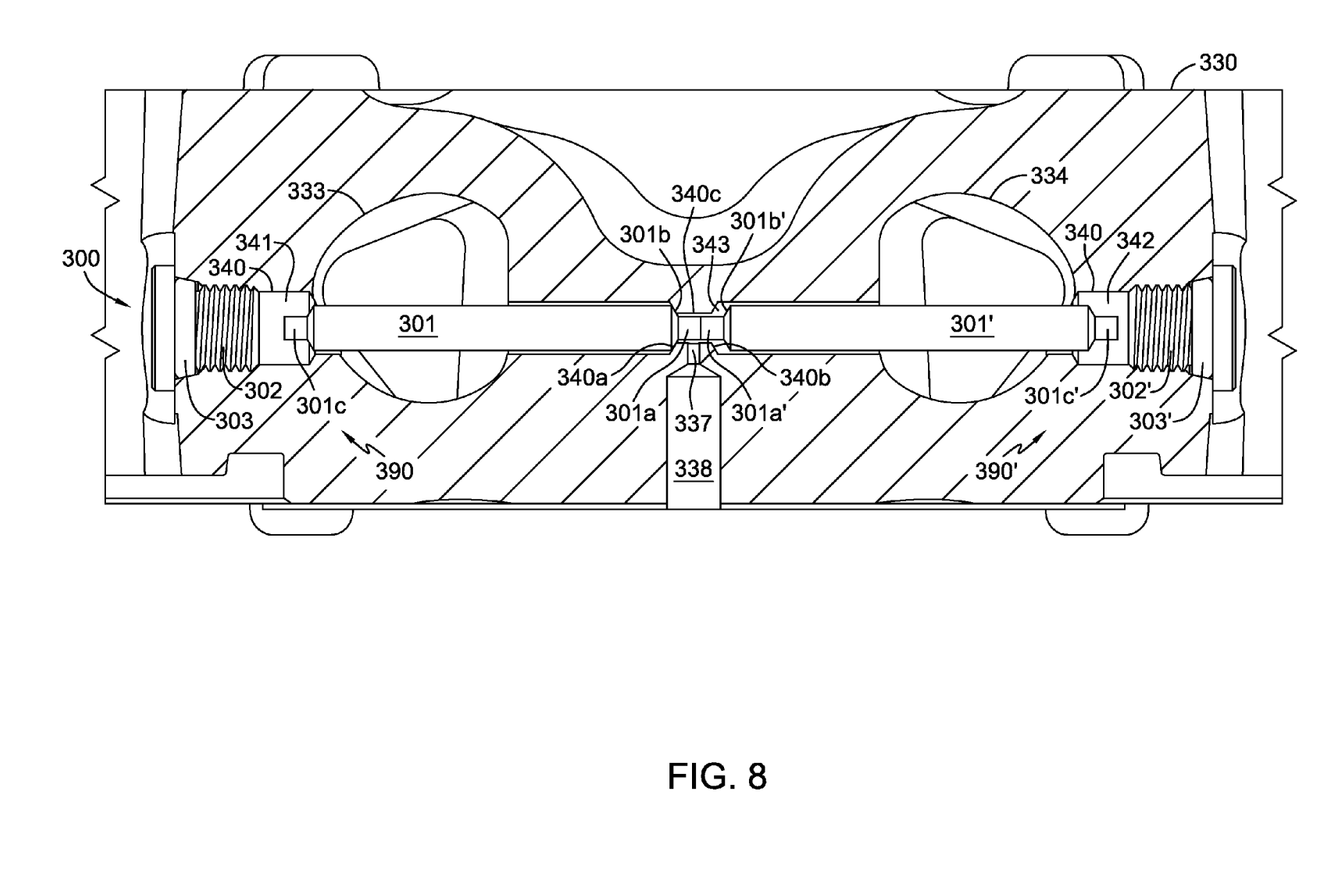
FIG. 8 is an alternate cross-sectional view, similar to that of FIG. 5, the valve bore being adapted to receive and guide another embodiment of the valve comprising a pair of elongated pistons.

FIG. 8 depicts another embodiment of the present invention, valve 300, again comprising a pair of identical subassemblies 390 and 390' whose right-side components are labeled with a "prime" designation. By way of introduction, components of the left-hand subassembly will be referenced with the understanding that such comments apply equally to both subassemblies. Each subassembly 390 and 390' comprises a valve piston 301, a valve plug 302, and an O-ring 303. Whereas the previous embodiments feature an elongated valve plug, 102 or 202, valve 300 features an elongated valve piston 301 having an extended tip of reduced diameter 301a and a valve seat 301b at a first end. Valve piston 301 may have the same profile at a second end 301c, error proofing installation of the valve 300. While a variety of second-end profiles, including but not limited to a flat profile, will serve the functional purposes of valve 300, it should be recognized that accidental reversed installation of such a two-profile piston would prevent sealing engagement with the corresponding seating surface and could result in damage to the hydraulic component.

Application of the valve 300 again requires a valve bore 340 in fluid communication with both the first and second fluid sides of a hydraulic circuit. As depicted in FIG. 8 for illustration purposes not meant to limit application of the present invention, valve bore 340 lies within a motor port block 330 similar in application to that of previously detailed motor port block 30. Valve bore 340 comprises a plurality of segments having decreasing diameters as a central segment 340c is approached from either end of the bore 340. An annulus of a diameter greater than that of central segment 340c lies at each end of segment 340c, the annuli serving as valve seats 340a and 340b for pistons 301 and 301', respectively. It should be noted that as with prior embodiments of the present invention, the extended tips 301a and 301a' of each piston are dimensioned such that one or the other piston may be seated at any given time, but not both. Unlike prior embodiments having small poppets guided by the extensions of the valve plugs, the pistons 301 and 301' of valve 300 are only guided and constrained by the dimensions of valve bore 340. While the pistons 301 and 301' are able to move axially within valve bore 340, they do not contact valve plugs 302 and 302' during high flow operation. This is because, under such conditions, the fluid pressures in porting 333 and 334, and corresponding volumes 341 and 342, act on the second ends 301c and 301c' of the pistons, keeping their extended tips 301a and 301a' in contact with each other and the second ends 301c and 301c' displaced from valve plugs 302 and 302'.

As depicted in FIG. 8, the relative fluid pressure in porting 333 and valve bore volume 341 is greater than that of porting 334 and valve bore volume 342, shifting pistons 301 and 301' to the right as a result of the greater fluid force acting on piston 301 than its equally dimensioned counterpart, piston 301'. Consequently, extended tip 301a acts directly on extended tip 301a', displacing piston 301' to the right. As a result, annular shoulder 301b sealingly engages valve seat 340a to prevent diversion of high pressure fluid from the closed loop. Displacement of piston 301' from seat surface 340b opens a pathway 343 for low pressure hydraulic fluid to be diverted from porting 334 through central segment 340c and bleed orifice 337 to the associated gallery 338 leading to a motor sump (not shown).

To aid the performance of valve 300 when valve bore 340 is oriented vertically in a given application, valve pistons 301 and 301' may be made of a plastic having a density approximately the same as that of the hydraulic fluid, typically a 20W50 motor oil, such as a nylon or acetal based plastic. This reduces the effect of gravity on the elongated pistons in valve bore 340 when the bore is vertically oriented, allowing valve 300 to perform as responsively as the prior embodiments whose smaller poppets 101 or 201 can be made of a steel alloy without any noticeable reduction in performance from gravitational effects. It will be further appreciated by those in the art that all or portions of valve 100 or valve 200 could also be made of an appropriate plastic.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

I claim:
1. A hydraulic system, comprising:
a first hydraulic unit and a second hydraulic unit connected by a hydraulic circuit having a first fluid side and a second fluid side;
a block comprising:
a valve bore formed in the block and extending from a first opening on a first side of the block to a second opening on a second side of the block opposite the first side, the valve bore having a first valve seat and a second valve seat formed therein;
a running surface for the first hydraulic unit disposed on a working surface extending between the first side and the second side;
a first internal port connected to the first fluid side between the first opening and the first valve seat; and
a second internal port connected to the second fluid side between the second opening and the second valve seat, whereby the first opening and the second opening are both separate from the first internal port and the second internal port; and
a third internal port connected to a sump and intersecting the valve bore between the first valve seat and the second valve seat;
a shuttle valve comprising:
a first piston disposed in the valve bore and adjacent to the first valve seat; and
a second piston disposed in the valve bore adjacent to the second valve seat, wherein the first piston and the second piston each comprise a main body, a first end, a second end opposite the first end and a first extension formed on the respective first end, the first extension having a diameter that is less than a diameter of the respective main body, and wherein the first end of the first piston is proximate the first valve seat, and the first end of the second piston is proximate the second valve seat; and
wherein the first piston and the second piston are each axially movable within the valve bore solely by means of differences in hydraulic pressure in the first fluid side and the second fluid side, and no mechanical spring force is applied to either the first piston or the second piston, such that hydraulic pressure causes the first end of the first piston to engage the first valve seat and the first extension of the first piston to engage the first extension of the second piston, sliding the second piston to its open position to connect the second fluid side with the sump through the third internal port when the hydraulic pressure on the first fluid side is greater than the hydraulic pressure on the second fluid side, and hydraulic pressure causes the first end of the second piston to engage the second valve seat and the first extension of the second piston to engage the first extension of the first piston, sliding the first piston to its open position to connect the first fluid side with the sump through the third internal port, when hydraulic pressure on the second fluid side is greater than the hydraulic pressure on the first fluid side; and
a first valve plug disposed in the first opening to prevent hydraulic fluid from flowing through the first opening during operation of the hydraulic system, and a second valve plug disposed in the second opening to prevent the hydraulic fluid from flowing through the second opening during operation of the hydraulic system.

2. The hydraulic system of claim 1, wherein the first hydraulic unit is an axial piston hydraulic motor.

3. The hydraulic system of claim 2, wherein the first internal port is hydraulically connected to a first pump system port and the second internal port is hydraulically connected to a second pump system port.

4. The hydraulic system of claim 1, wherein the first piston and the second piston are made from a nylon or acetal based plastic.

5. The hydraulic system of claim 4, wherein the first piston and the second piston each comprise a second extension, formed on the respective second end, each second extension having a diameter that is less than the diameter of the respective main body.

6. The hydraulic system of claim 5, wherein the second extension of the second piston is identical to the first extension of the second piston.

7. The hydraulic system of claim 6, wherein the first hydraulic unit is an axial piston hydraulic motor disposed on the running surface, and the first internal port is hydraulically connected to a first pump system port and the second internal port is hydraulically connected to a second pump system port.

8. The hydraulic system of claim 7, wherein the sump is connected to a charge pump inlet.

9. The hydraulic system of claim 1, wherein the third internal port is connected to a center segment of the valve bore, and the center segment has a diameter that is smaller than the diameter of the segments of the valve bore in which the first piston and the second piston are disposed.

10. A hydraulic system having a hydraulic circuit with a first fluid side and a second fluid side, the hydraulic system comprising:
a block comprising:
a valve bore having a first end opening on a first side of the block, a second end opening on a second side of the block, a first valve seat formed in the valve bore and a second valve seat formed in the valve bore;
a first internal port connected to the first fluid side and intersecting the valve bore between the first end and the first valve seat;
a second internal port connected to the second fluid side and intersecting the valve bore between the second end and the second valve seat;
a third internal port connected to a sump and intersecting the valve bore between the first valve seat and the second valve seat; and
a working surface of the block extending between the first side and the second side thereof and having a running surface formed thereon;
a first valve plug disposed in the valve bore at the first end to prevent hydraulic fluid from flowing through the first end during operation of the hydraulic system, and a second valve plug disposed in the valve bore at the second end to prevent the hydraulic fluid from flowing through the second end during operation of the hydraulic system;
a first piston and a second piston disposed in the valve bore, each piston comprising a main body having a first end and a second end opposite the first end, and a first extension formed on the respective first end and having a diameter that is less than a diameter of the respective main body, and wherein the first end of the first piston is proximate the first valve seat, and the first end of the second piston is proximate the second valve seat;
wherein the first piston and the second piston are each axially movable within the valve bore solely by means of differences in hydraulic pressure in the first fluid side and the second fluid side, and no mechanical spring force is applied to either the first piston or the second piston, such that hydraulic pressure causes the first end of the first piston to engage the first valve seat and the first extension of the first piston to engage the first extension of the second piston, sliding the second piston to its open position to connect the second fluid side with the sump through the third internal port when the hydraulic pressure on the first fluid side is greater than the hydraulic pressure on the second fluid side, and hydraulic pressure causes the first end of the second piston to engage the second valve seat and the first extension of the second piston to engage the first extension of the first piston, sliding the first piston to its open position to connect the first fluid side with the sump through the third internal port, when hydraulic pressure on the second fluid side is greater than the hydraulic pressure on the first fluid side.

11. The hydraulic system of claim 10, wherein the first piston and the second piston each comprise a second extension, formed on the respective second end, each second extension having a diameter that is less than the diameter of the respective main body.

12. The hydraulic system of claim 11, wherein the second extension of the second piston is identical to the first extension of the second piston.

13. The hydraulic system of claim 10, wherein the first piston and the second piston are made from a nylon or acetal based plastic.

14. The hydraulic system of claim 13, further comprising an axial piston hydraulic motor disposed on the running surface.

15. The hydraulic system of claim 14, wherein the first internal port is connected to a first pump system port and the second internal port is connected to a second pump system port.

16. The hydraulic system of claim 15, wherein the sump is connected to a charge pump inlet.

17. The hydraulic system of claim 10, wherein the third internal port is connected to a center segment of the valve bore, and the center segment has a diameter that is smaller than the diameter of the segments of the valve bore in which the first piston and the second piston are disposed.

18. A hydraulic system using hydraulic fluid and having a first fluid side and a second fluid side, the hydraulic system comprising:
a valve block having a first end, a second end opposite to the first end, a first internal port connected to the first fluid side, a second internal port connected to the second fluid side and a third internal port connected to a sump;
a valve bore formed in the valve block and comprising:
a first segment extending from a first opening on the first end of the valve block and terminating in a first valve seat, the first segment connected to the first internal port at a first point between the first opening and the first valve seat;
a second segment extending from a second opening on the second end of the valve block and terminating in a second valve seat, the second segment connected to the second internal port at a second point between the second opening and the second valve seat; and
a center segment disposed between the first segment and the second segment and connected to the third internal port, wherein the first segment and the second segment both have an equal, first diameter, and the center segment has a second diameter smaller than the first diameter;
a first piston disposed in the first segment and slidable between a closed position where the first piston engages the first valve seat and an open position, the first piston comprising a first main body having a proximal end adjacent the first valve seat and a distal end, the first main body having a third diameter sized to fit within the first diameter;
a first extension formed on and extending from the proximal end of the first main body, the first extension having a fourth diameter smaller than the third diameter and being sized to fit within the center segment;
a second piston disposed in the second segment and slidable between a closed position where the second piston is engaged to the second valve seat and an open position, the second piston comprising a second main body having a proximal end adjacent the second valve seat and a distal end, the second main body having a diameter that is equal to the third diameter;
a second extension formed on the proximal end of the second main body, the second extension having a fifth diameter smaller than the third diameter and being sized to fit within the center segment;
wherein, when the hydraulic pressure on the first fluid side is greater than the hydraulic pressure on the second fluid side, the first extension engages the second extension, sliding the second piston to its open position and, when hydraulic pressure on the second fluid side is greater than the hydraulic pressure on the first fluid side, the second extension engages the first extension, sliding the first piston to its open position, and wherein the first piston and the second piston are each axially movable within the valve bore solely by means of differences in hydraulic pressure in the first fluid side and the second fluid side, and no mechanical spring force is applied to either the first piston or the second piston.

19. The hydraulic system of claim 18, further comprising a third extension formed on the distal end of the first main body, and a fourth extension formed on the distal end of the second main body, wherein the third extension and the fourth extension both have a diameter that is equal to the fourth diameter.

20. The hydraulic system of claim 18, wherein the first piston and the second piston are made from a nylon or acetal based plastic.

\* \* \* \* \*